US008527339B2

(12) United States Patent
Gunawardana et al.

(10) Patent No.: US 8,527,339 B2
(45) Date of Patent: Sep. 3, 2013

(54) QUALITY BASED PRICING AND RANKING FOR ONLINE ADS

(75) Inventors: Asela J. Gunawardana, Seattle, WA (US); Jody D. Biggs, Redmond, WA (US); Jesper B. Lind, Bellevue, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 12/146,473

(22) Filed: Jun. 26, 2008

(65) Prior Publication Data

US 2009/0327032 A1 Dec. 31, 2009

(51) Int. Cl.
*G06Q 99/00* (2006.01)

(52) U.S. Cl.
USPC ............... 705/14.4; 705/14.41; 705/14.42; 705/14.43

(58) Field of Classification Search
USPC .............. 705/10, 14.4, 14.41, 14.42, 14.43
See application file for complete search history.

(56) References Cited

U.S. PATENT DOCUMENTS

| | | | |
|---|---|---|---|
| 7,231,395 B2 | 6/2007 | Fain et al. | |
| 2003/0055816 A1 | 3/2003 | Paine et al. | |
| 2005/0114198 A1 | 5/2005 | Koningstein et al. | |
| 2006/0004628 A1* | 1/2006 | Axe et al. | 705/14 |
| 2006/0020506 A1 | 1/2006 | Axe et al. | |
| 2007/0005417 A1 | 1/2007 | Desikan et al. | |
| 2007/0033105 A1* | 2/2007 | Collins et al. | 705/14 |
| 2007/0150348 A1 | 6/2007 | Hussain et al. | |
| 2007/0156621 A1 | 7/2007 | Wright et al. | |
| 2007/0179845 A1* | 8/2007 | Jain | 705/14 |
| 2008/0275757 A1* | 11/2008 | Sharma et al. | 705/10 |

FOREIGN PATENT DOCUMENTS

JP 2005285143 A * 10/2005

OTHER PUBLICATIONS

Elesseily, "New Panama Ranking System For Yahoo Ads Launches Today", Feb. 5, 2007, Web Article. Webpage Avilable at: http://searchengineland.com/070205-090623.php.
"Quality Score: Just Another Google Puzzle?", Nov. 28, 2007. Web Article. Webpage Available at: http://www.augustash.com/blog/2007/11/28/quality-score-just-another-google-puzzle/.
Goodman., "The Importance of Clickthrough Rate (CTR): Has it Changed?", Posted on the web on Jul. 25, 2005, Web Article Available on: http://www.traffick.com/articles/internet-marketing/advanced-adwords-strategies.asp.

(Continued)

*Primary Examiner* — Akiba Allen
(74) *Attorney, Agent, or Firm* — Lyon & Harr, LLP; Mark A. Watson

(57) ABSTRACT

A "Quality-Based Ad Pricer" prices ads as a function of how users respond to a particular page and/or domain to which they are sent by an online advertisement. User experience is improved by ensuring that advertisements that are more relevant to a user are priced less than an ads which are less relevant to the user. In particular, a quality factor for each ad is determined as a property of the advertiser's site based on measured user behaviors with respect to that site. This quality factor is then used in ranking, selecting, and pricing ads in an automated online auction. Further, while ad aggregators are not excluded from the ad market by the pricing rules of the Quality-Based Ad Pricer, these rules ensure that there is a "level playing field" such that ads of merchants are not excluded by the ads of ad aggregators.

17 Claims, 5 Drawing Sheets

(56) References Cited

OTHER PUBLICATIONS

"Google Announces Third Quarter 2007 Results", Mountain View, Calif.—Oct. 18, 2007—Google Inc. 13 Pages.

Edelman, et al., "Internet Advertising and the Generalized Second Price Auction: Selling Billions of Dollars Worth of Keywords", NBER Working Paper No. 11765. Issued in Nov. 2005 21 Pages.

Varian, "Position Auctions", Technical Report, UC Berkeley, 2006. 21 Pages.

Athey, et al., "Position Auctions with Consumer Search", UCLA Department of Economics in its series Levine's Bibliography. Sep. 2007, 28 pages.

Richardson, et al., "Predicting Clicks: Estimating the Click-Through Rate for New Ads", WWW 2007, May 8-12, 2007. pp. 521-529.

O'Connell, et al., "The bigger they are, the harder they fall", Journal of International Economics 56 (2002), Jul. 5, 2000. pp. 21-53.

Aggarwal, et al., "Truthful Auctions for Pricing Search Keywords", ACM conference on electronic commerce, 2006. Mar. 12, 2006, 14 pages.

Varian, "The Arbitrage Principle in Financial Economics", The Journal of Economic Perspectives, vol. 1,No. 2 (Autumn, 1987). pp. 55-72.

Peter Isard, "How far can we push the "law of one price"", The American Economic Review, vol. 67, No. 5 (Dec. 1977), pp. 942-948.

"Ad Quality and Performance—AdWords Help Center", Copyright 2008, Google. Webpage Available at: https://adwords.google.com/support/bin/topic.py?topic=7091.

\* cited by examiner

QUALITY BASED PRICING AND RANKING FOR ONLINE ADS

BACKGROUND

1. Technical Field

A "Quality-Based Ad Pricer" provides techniques for pricing advertisements, and in particular, various techniques for explicitly adjusting ad pricing based on advertiser redirection rates and statistical quality determinations computed from measured user responses to advertiser web sites that allow merchants who do not aggregate to compete fairly with ad aggregators to improve user experience.

2. Related Art

Online advertising is quickly growing industry. For example, one organization that provides online searches via a "search engine" reported revenues of over US$10 billion for the first three quarters of 2007 for embedding advertisements into search result pages generated in response to user queries entered into the search engine maintained by that organization. Much of this revenue comes from pay-per-click "search advertising" or "syndicated contextual advertising."

Generally, in search advertising, advertisers bid to have short text ads shown with search engine results that are also clicked on by search engine users. The ads that are displayed are generally chosen through a generalized second price (GSP), auction or a Vickrey-type auction, which also determines the price each advertiser is charged when their ad is clicked. Advertisers are charged only when their ad is clicked, not when it is displayed. Unlike traditional advertising, search engine advertising is highly targeted both because the advertiser selects which search queries trigger the display of their ads and because search engines only display ads that are likely to be clicked. The existence of multiple search engines that offer auctions for pay-per-click search ads means that the sets of participants in these auctions can differ. Therefore, the per-click prices on different search engines can also differ.

In contrast, with syndicated contextual advertising the search engine "syndicates" the ads, which then appear on third-party publisher websites rather than on the search results page. Generally, the third party publisher has little or no control over the specific ads that are served on their site. These ads are also sold on a pay-per-click basis. However, in this case, the payment is shared between the search engine and the third-party publisher. In contrast to search ads, where the ads are chosen based on an explicit user query, in contextual advertising the search engine attempts to match the ads to the content of third-party publisher sites, usually based on site content. This matching theoretically provides users with links to other pages or products that might have some relationship to the page the user is currently viewing, and is this presumably interested in.

As with search advertising, syndicated contextual advertising ads are also selected through an auction. As noted above, in search advertising, advertisers bid in an auction to have their ads displayed on the results page for searches on particular keywords. In contrast, with syndicated ads, advertising, keywords are extracted from participating web pages, and advertisers bid in auctions to have their ads shown on pages that appear to correspond to particular keywords. Note that in both cases, these auctions are automated processes that generally operate based on maximum bids submitted by individual advertisers for each unique advertisement.

In either case, online advertisements ("ads") are often ranked by expected cost per impression (i.e., the probability of click times bid), and the ads are displayed in the rank order, with higher ranked ads costing more money (i.e., requiring higher bids). When an ad is clicked, the advertiser is charged the minimum they would have had to bid to retain their rank. Users that click on these ads are directed to a webpage chosen by the corresponding advertiser. Thus, which ads are displayed and how much advertisers have to pay per click have nothing to do with how much value the advertiser's webpage delivers to the advertiser or to the user. In particular, reputable sites that sell the goods advertised on the ad pay the same as deceptive sites that promise cheap goods in their ad but then take the user to a page full of ads, or harvest personal information, as long as they have the same click-through-rate (CTR) or click-through probability.

The existence of both search and syndicated advertising markets has allowed the practice of "ad aggregation." Ad aggregators place syndicated ads on their web pages, and then attract traffic to these web pages by placing search ads. They are profitable when they pay less for incoming clicks on their search ads than they receive for outgoing clicks on the syndicated ads that they host. Because ad aggregation involves buying clicks in one market and selling them in another for a profit, this practice is sometimes referred to "click arbitrage." However, in contrast to true market arbitrage, which is generally considered to increase market efficiency, click arbitrage is generally considered to have a negative effect on both individual users and on true merchants that are attempting to advertise their goods using either search advertising or syndicated advertising.

In particular, a closer examination of ad aggregation reveals that it is not simply arbitrage. For example, ad aggregators generally attempt to induce incoming users to click on multiple syndicated ads, thereby generating higher revenue for themselves. In this process, the term "redirection rate" is used to denote the number of outgoing syndicated clicks an aggregator gets per incoming click. When an aggregator's redirection rate exceeds unity, they are able to sell more clicks than they buy. As a result, ad aggregators are profitable even if their buying and selling per-click prices are the same. This contrasts with arbitrage, which can only be profitable in the presence of a price imbalance.

Such practices are considered to harm both individuals and true merchants attempting to advertise their goods, since when ad aggregators win advertising slots, instead of merchants, they prevent consumers from reaching merchants directly. Unfortunately, most merchants cannot compete with ad aggregators since the aggregators are generally willing to pay higher prices for clicks, since they expect to resell more clicks than they pay for. In fact, it has been observed that the majority of the top advertisers in a real ad market are aggregators that use this advantage to displace merchants from advertising slots.

Therefore, aggregators who achieve high redirection rates directly displace merchants since the aggregators bid more than the merchants are willing or able to pay. Further, the user experience is degraded by the practice of ad aggregation since the ad aggregator specifically designs their pages to capture the users' attention and induce them to click on more syndicated ads, rather than specifically designing their pages to provide what the user may actually be looking for. In fact, what the user generally wants, but rarely receives, is an ad that links them directly to the merchant that is selling the product that they are specifically looking for.

Recently, quality issues have begun to receive some attention. For example, one conventional search engine uses a "quality score" as a dynamic variable assigned to each keyword (i.e., a word included in the user's search query). This quality score is calculated using a variety of factors, and generally measures how relevant a particular keyword is to the ad text and to a user's search query. These quality scores then influence the position of ads on the search results page. Further, the quality score is also used in part to determine minimum bids for particular keywords. In general, the higher the quality score, the better the ad position and the lower the corresponding minimum bid. In general, the "formula" for calculating the "quality score" of this conventional search engine varies depending on whether it is calculating minimum bids or assigning ad position. It also varies based on whether it is affecting a keyword-targeted ad on a search network, a keyword-targeted ad on a content network, or a placement-targeted ad.

In other work, one conventional study models user attention, user surplus, and the resulting externalities of advertisers on each other. In particular, a model is suggested wherein users incur a "cost" every time they click on an ad, gain a "constant utility" when their need is met from an ad, and decide to stop browsing further ads when the cost of another click exceeds the expected benefit of continued browsing. This model illustrates some of the excess negative externality imposed on other advertisers by advertisers that have high click-through probability and high bid, but low probability of meeting the user's need, as such an advertiser would reduce the user's expectation of the utility of continued browsing.

This work then proposes a mechanism that takes into account the advertisers' probabilities of meeting a user's need, and describes how such a mechanism maximizes user surplus. However, while the study describes how "search-diverting sites" can lead to merchants dropping out of the publishing engine's auction, the proposed model described therein assumes counterfactually that all advertisers derive an expected per-click payoff given by the advertiser's probability of meeting the user's click times a constant. In other words, this study erroneously assumes that an advertiser's payoff is contingent on meeting a user's need, and that meeting a user's need results in the same payoff for all advertisers. As such, the concept of ad aggregation is not properly considered or modeled.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Quality-Based Ad Pricer" provides various techniques for implementing automated ad pricing rules for search ads and syndicated contextual ads. The ad pricing rules provided by the Quality-Based Ad Pricer directly address various problems caused by ad aggregation, such as displacement of actual merchant ads by ad aggregators, and degraded user experience. These issues are addressed by using statistical evaluations of user behavior with respect to particular ads, particular ad landing pages (i.e., the page served to the user upon clicking an ad), particular advertiser domains, etc., to generate statistical "quality factors" that are used in determining ad prices. Thus, the automated ad pricing rules provided by the Quality-Based Ad Pricer improve user experience while allowing merchants who do not aggregate to compete fairly with ad aggregators. At the same time, the ad pricing rules provided by the Quality-Based Ad Pricer allows ad aggregators to take advantage of pricing imbalances, thereby facilitating ad price convergence.

More specifically, the Quality-Based Ad Pricer provides an environment in which ads are priced, in part, as a function of how users respond to a particular page and/or domain to which they are sent by a particular ad. As such, user experience is improved by ensuring that ads that are more relevant to the user, such as ads that link directly to a merchant, for example, are priced less and ranked higher, than an ad which is less relevant to the user, such as the page of an ad aggregator. Further, while ad aggregators are not excluded from the ad market by the pricing rules of the Quality-Based Ad Pricer, these rules ensure that there is a "level playing field" such that ads of merchants are not excluded by the ads of ad aggregators.

In view of the above summary, it is clear that the Quality-Based Ad Pricer described herein provides various unique techniques for explicitly adjusting ad pricing as a function of statistical quality determinations computed from measured user responses to advertiser web sites to improve user experience while allowing merchants who do not aggregate to compete fairly with ad aggregators. In addition to the just described benefits, other advantages of the Quality-Based Ad Pricer will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
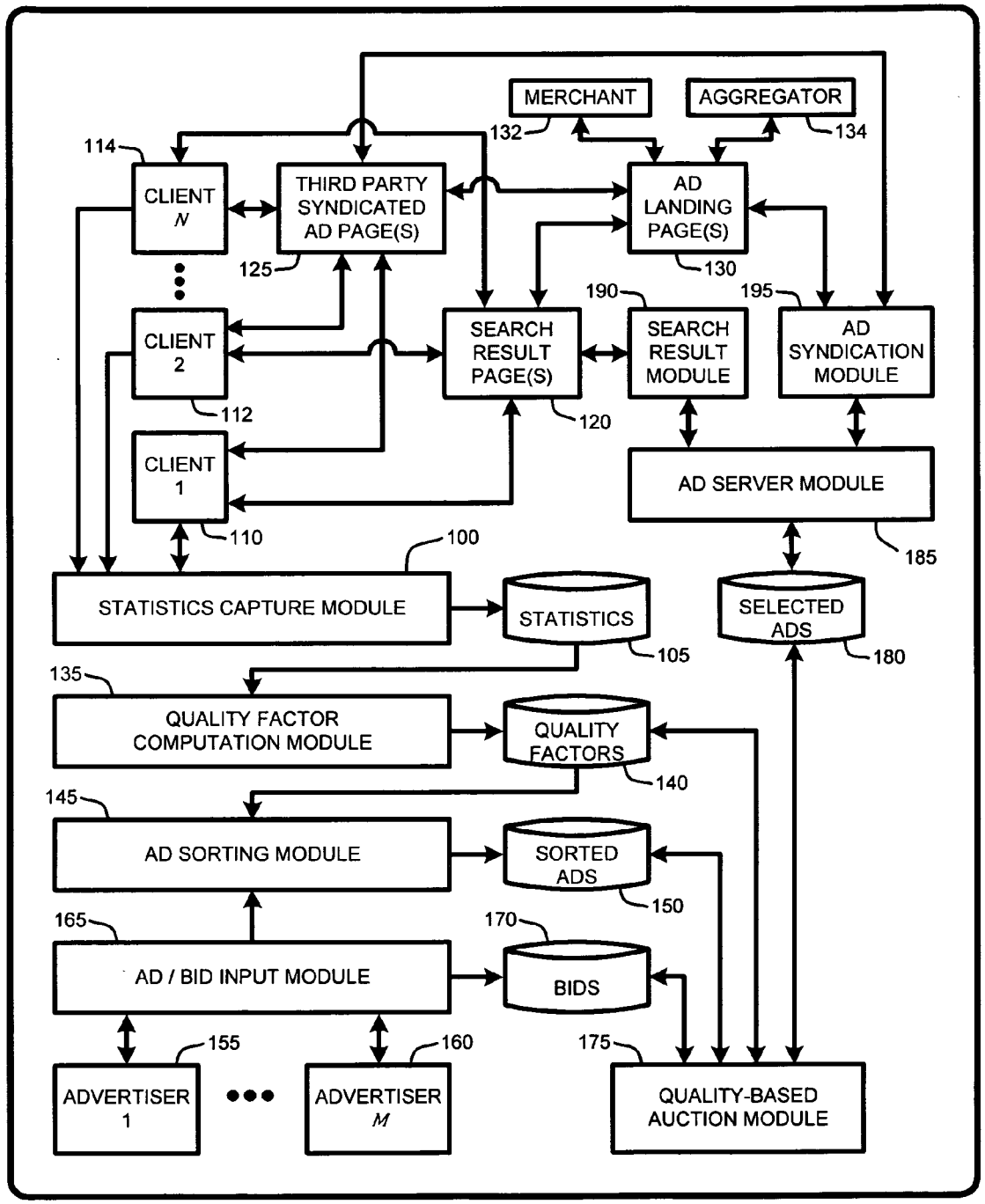
FIG. 1 provides an exemplary architectural flow diagram that illustrates program modules for implementing various embodiments of a "Quality-Based Ad Pricer," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

As is known to those skilled in the art of online advertising, "ad aggregators" generally operate to extract more value per click than any non-aggregating merchant as long as they can induce users to click on multiple syndicated ads. As described in further detail herein, such aggregators can defeat non-aggregating merchants in ad auctions, and dominate the market. In extreme cases, this effect can lead to no ads from merchants being displayed, which is arguably suboptimal for both users and merchants. Further, ad aggregators may also allow one ad platform or engine (such as, for example, a search engine or contextual advertising platform or engine) to manipulate prices on another.

A "Quality-Based Ad Pricer," as described herein, provides an environment in which ads are priced, in part, as a function of how users respond to a particular page and/or domain to which they are sent by a particular ad. As such, user experience is improved by ensuring that ads that are more relevant to a user, such as ads that link directly to a merchant, for example, are priced less than an ad which is less relevant to the user, such as the page of an ad aggregator. Further, while ad aggregators are not excluded from the ad market by the pricing rules of the Quality-Based Ad Pricer, these rules ensure that there is a "level playing field" such that ads of merchants are not excluded by the ads of ad aggregators.

More specifically, the Quality-Based Ad Pricer provides an aggregator pricing rule that a publishing engine (e.g., a search engine such as Microsoft® Live Search, YAHOO! ® Search, Google™, etc.) can use in order to guard against the negative impact that ad aggregators can otherwise have. Various embodiments of this pricing rule is implemented within various types of online auctions, such as, for example, a modified generalized second price (GSP) auction or a modified Vickrey-type auction, that incorporate a quality factor, Q, in ranking and pricing. Note that in contrast to conventional pricing schemes, the quality factor computed by the Quality-Based Ad Pricer is determined as a property of the advertiser's site based on measured user behaviors with respect to that site, as opposed to a factor that merely accounts for a particular ad or an advertiser's click-through probability.

1.1 System Overview:

As noted above, the Quality-Based Ad Pricer provides various techniques for explicitly adjusting ad pricing as a function of statistical quality determinations computed from measured user responses to advertiser web sites. The result is an improved user experience which allows merchants who do not aggregate to compete fairly with ad aggregators. The processes summarized above are illustrated by the general system diagram of FIG. 1.

In particular, the system diagram of FIG. 1 illustrates the interrelationships between program modules for implementing various embodiments of the Quality-Based Ad Pricer, as described herein. Furthermore, while the system diagram of FIG. 1 illustrates a high-level view of various embodiments of the Quality-Based Ad Pricer, FIG. 1 is not intended to provide an exhaustive or complete illustration of every possible embodiment of the Quality-Based Ad Pricer as described throughout this document.

In addition, it should be noted that any boxes and interconnections between boxes that are represented by broken or dashed lines in FIG. 1 represent alternate embodiments of the Quality-Based Ad Pricer described herein, and that any or all of these alternate embodiments, as described below, may be used in combination with other alternate embodiments that are described throughout this document.

In general, as illustrated by FIG. 1, the Quality-Based Ad Pricer begins operation by using a statistics capture module 100 to collect statistics 105 from a plurality of clients (110, 112, and 114). In general, as described in Section 2.6, these statistics 105 describe user interaction and responses to ads served on search result pages 120 or third party syndicated ad pages 125.

The search result pages 125 are provided to the user in response to user entry of a query into a search engine or the like. Ads included on the search result page 125 are typically matched to keywords entered by the user as a part of the search query, and are provided in a ranked order which is determined as a function of several factors, including computed statistical quality factors 140, that are computed by a quality factor computation module 135 from the collected statistics 105.

In contrast, third party syndicated ad pages 125 are generally one of two types of web pages. For example, in a first type, the third party page 125 is simply a web page that allows syndicated contextual advertising to be automatically placed within the page by an ad syndication engine that chooses the ads displayed, typically based on a keyword association with various content of that web page. A second type of third party web page 125 is that of an "ad aggregator." In general, ad aggregators place syndicated ads on their web pages, and then specifically act to attract traffic to these web pages by placing search ads. In both cases, the third party page 125 will receive income when a user clicks on an ad on that page. However, in the second case, the third party page 125 is also considered to be an ad landing page 130.

In general, an ad landing page 130 is simply a page that is presented to the user whenever a user selects an ad by clicking on that ad. In some cases, the ad landing page 130 is that of a merchant 132, with no further ads, while in other cases, the ad landing page is that of an ad aggregator 134 (including "aggregating merchants," as described in Section 2.5.1) which includes additional ads.

In any case, whether the page being displayed to the user is a search result page 120, a third party syndicated ad page 125, or an ad landing page 130 of an ad aggregator, the ads that are displayed are selected based on a process that specifically considers the quality factors 140 computed from the collected statistics 105.

In particular, as described in detail in Section 2.7, once the quality factors 140 have been computed, an ad sorting module 145 sorts the ads in decreasing order of the product of their quality factor, click-through probability, and the advertisers bid. Note that the concept of a click-through probability is a well-known concept that generally describes a probability of a user clicking on a particular ad. It should also be noted that the click-through probability can be specifically computed by the statistics capture module 100 and stored with the statistics 105. The bid is simply the maximum amount that the advertiser is willing to pay to have a particular ad displayed Further, it should also be noted that while the following discussion generally assumes the use of a click-through probability for purposes of explanation, other click-based probabilities are used in various embodiments in place of the click-through probabilities depending upon the advertising payment scheme being used. For example, in various embodiments, ads are paid using a variety of payment schemes, including, for example, pay-per-click, pay-per-impression, pay-per-action, etc., advertising schemes. In the case of pay-per-impression advertising, ads are paid for whenever they are placed for the user to view. In this case, a probability of "1" can be used in place of the click-through probability. With respect to pay-per-action type advertising, "action probabilities" are used instead of click-through probabilities, where some predefined action by the user triggers a payment from the advertiser when the user action is performed. Clearly, those skilled in the art will appreciate that the Quality-Based Ad Pricer can be used in combination with any desired payment scheme (e.g., pay-per-click, pay-per-impression, pay-per-conversion, pay-per-action, etc.) by simply replacing the click-through-probabilities described herein with the appropriate "payment probability" corresponding to the selected advertising payment scheme.

In general, each advertiser, 155 and 160, submits their ads and corresponding bids 170 (relative to one or more keywords) to an ad/bid input module 165. As noted above, the bids 170 are used by the ad sorting module 145 in combination with the quality factors 140 to determine the sorted ads 150. This information is then provided to a quality-based auction module 175. In the case of a modified GSP-type auction, the quality-based auction module 175 selects the top sorted ads 150 for display, and assigns a price per click, P, to each selected ad based on the quality factor of the ad, the click-through probability of the ad, relative to quality, and click-through probability of the next ad in the sorted list, and the bid corresponding to that next ad, as illustrated by Equation (2) in Section 2.7. In various embodiments, the quality-based auction module 175 uses other online auction techniques, such as, for example, a modified Vickrey-Clarke-Groves (VCG) type auction that selects the top sorted ads for display, and assigns a price per click, P, to each selected ad based on the quality factor of the ad, the click-through probability of the ad, as well as the quality, click-through probability, and bid of all ads following it in the sorted list.

Then, having priced each of the ads the quality-based auction module 175 outputs selected ads 180 with their price per click for use by an ad server module 185 that serves the ranked ads to either a search result module 190 or an ad syndication module 195. In general, the search result module 190 simply populates the aforementioned search result page 120 with ads that best match the user query in terms of the selected ads 180 provided by the quality-based auction module 175. Similarly, the ad syndication module 195 simply populates either the third party syndicated ad page 125, or the ad landing page 130 of the ad aggregator 134.

2.0 Operation Overview:

The above-described program modules are employed for implementing various embodiments of the Quality-Based Ad Pricer. As summarized above, the Quality-Based Ad Pricer provides various techniques for explicitly adjusting ad pricing as a function of statistical quality determinations computed from measured user responses to advertiser web sites to improve user experience while allowing merchants who do not aggregate to compete fairly with ad aggregators. The following sections provide a detailed discussion of the operation of various embodiments of the Quality-Based Ad Pricer, and of exemplary methods for implementing the program modules described in Section 1 with respect to FIG. 1.

2.1 Operational Details of the Quality-Based Ad Pricer:

In general, the Quality-Based Ad Pricer provides various techniques for adjusting ad pricing as a function of statistical quality determinations computed from measured user responses. The following paragraphs provide examples and operational details of various embodiments of the Quality-Based Ad Pricer, including: a discussion of conventional advertisement arbitrage in an Internet type environment; conventional ad aggregation; the impact of ad aggregation on merchants, users and ad syndication engines; exemplary user behaviors in response to ads and ad aggregation; collection and evaluation of statistical data for measuring user responses to ads and aggregations; aggregator pricing rules provided by the Quality-Based Ad Pricer.

2.2 Conventional Advertisement Arbitrage:

Arbitrage is usually defined as the practice of taking advantage of a difference in the price of a good or asset in two different markets by buying the good in the cheaper market and selling it in the more expensive market. Much of the literature in this area deals with "perfect" arbitrage, where the sale and the purchase are accomplished simultaneously, which provides a profit with no commitment of capital and no risk. It is somewhat of a folk theorem that arbitrage results in the prices in the two markets converging, resulting in the "Law of One Price" (LOP).

The general idea is that arbitrage leads to increased supply in the expensive market, and increased demand in the cheaper market, driving the prices to converge. In less idealized settings, the transaction may involve some costs (such as transportation), and risks (such as spoilage), so that a profit can be made only if the price difference is large enough. Thus, small price differences may persist, but large differences are quickly arbitraged away. A key feature is that arbitrage opportunities are temporary; arbitrage brings about price convergence, which eliminates the arbitrage opportunity, so that arbitrageurs effectively put themselves out of business.

Arbitrage in asymmetric cases, such as when one market has import barriers (such as high tariffs, regulations, etc), or when the other market has export barriers are relevant ideas in describing some of the features of the Quality-Based Ad Pricer. In classic asymmetric arbitrage cases, one market can only be a source in cross-market transactions, while the other can only be a sink. Arbitrage can only operate in one direction—from the source to the sink. The trade barrier removes the arbitrage opportunity when the price in the source market is higher than the price in the sink market so that the price difference can persist. However, if the price in the source market is lower than the price in the sink market, an arbitrage opportunity exists, and the difference will be arbitraged away. Thus, when an asymmetric barrier to trade exists, the full LOP cannot operate. Still, the temporary nature of arbitrage is preserved under this "half LOP."

2.2.1 Search Ad Arbitrage:

In pay-per-click search ad markets, advertisers bid to have their ads displayed on the results page corresponding to particular queries. Clicks on the ads lead users to "landing pages" controlled by the advertisers, and result in a payment from the advertiser to the search engine. Thus, advertisers are often described as buying clicks, while search engines are described as selling clicks. The choice of which ads are displayed, and the pricing of corresponding clicks on those ads, are usually determined through a Generalized Second Price (GSP) auction or a Vickrey-type auction.

In particular, in a conventional GSP auction, for each ad that is a candidate for being displayed for a particular query (i.e., search terms or keywords entered into a search engine), its expected maximum cost per impression is computed by multiplying the corresponding bid by an estimate of the probability that the ad will be clicked. The ads are then sorted in order of decreasing expected maximum cost per impression, and the top ads are displayed so that their relative prominence mirrors the sort order. Then, when an ad is clicked, the advertiser is charged the minimum they would have had to bid to still retain the position in which the ad was displayed.

Since each search engine that offers pay-per-click search advertising has its own independent auction, there are separate markets for clicks. Consequently, the price charged for an ad click on a particular search query can vary between these markets, which could present an arbitrage opportunity. However, this can only be an arbitrage opportunity if a mechanism existed to "transport" clicks between these markets. Thus, for purposes of explanation, a hypothetical mechanism, termed "transparent syndication" enables arbitrage between ad markets.

In transparent syndication, a syndicating engine provides a syndication feed consisting of the ads and their current per-click prices. Arbitrageurs can then enter the ads into the auction on a publishing engine. The arbitrageur makes no change to the ad, except for directing clicks on the ad to themselves instead of the original advertiser. The arbitrager then redirects these clicks to the syndicating engine, who in turn redirects them to the corresponding advertiser. The advertiser then pays the syndicating engine the per-click price determined on the syndicating engine, and the syndicating engine passes this payment on to the arbitrageur. In turn, the arbitrageur pays the publishing engine the per-click price determined on the publishing engine. The mechanism is transparent to the users, in that they cannot distinguish between ads entered into the publishing engine by the arbitrageur from those that are entered into the engine by the original advertisers, and it is transparent to advertisers in that they cannot distinguish between clicks from users on the syndicating and publishing engines.

When the per-click price of an ad is higher on one engine than on the other, an arbitrageur would be able to use the transparent syndication mechanism to buy clicks in the inexpensive market and sell them in the expensive one. Since this option is open to multiple arbitrageurs, and the price they can afford to pay per click is set by the per-click price on the expensive market, they would compete with each other, driving up the per-click price on the inexpensive market. Thus, transparent syndication would allow arbitrage, which in turn would cause price convergence. Any costs associated with this trade (including any fee retained by the syndicating engine) are analogous to transportation costs and risks in goods arbitrage. If the expensive market does not provide a transparent syndication feed, then arbitrage cannot take place, whereas the inexpensive market not providing a feed has no effect on arbitrage, just as in the case of goods arbitrage in the presence of a trade barrier.

2.3 Conventional Ad Aggregation:

While the hypothetical "transparent syndication" mechanism described in Section 2.2 does not explicitly exist, a different mechanism for ad syndication does. In real-world ad syndication, a syndicating engine provides ads which third-party websites display. These websites and the syndicating engine share the revenue resulting from clicks on these ads.

More specifically, while the publishing engine does not directly publish the syndicated ads, the third-party websites can advertise on the publishing engine, and pay the publishing engine for clicks on the ad. If the users that arrive on the third-party website though this ad then click on the syndicated ads they find there, the website earns revenue. Such third-party websites are referred to as "ad aggregators." An ad aggregator is profitable if they earn more from clicks on syndicated ads on their site than they have to pay the publishing engine for incoming clicks. For this reason, ad aggregators are often thought of as engaging in arbitrage, and are often described as "search engine arbitrageurs." Note that for purposes of explanation, "keyword arbitrageurs" are not specifically addressed by the discussion of search engine arbitrageurs and ad aggregators provided herein. However, it should be understood that similar considerations apply to the case of keyword arbitrageurs.

Ad aggregation differs from the idealization of "transparent syndication" described in Section 2.2 in a number of significant ways. For example, an aggregator does not insert a separate ad into the publishing engine's auction corresponding to each syndicated ad. Instead, the aggregator submits a single ad to the publishing engine' auction. When a user clicks on this ad, the aggregator is billed for the click, and the user is taken to the aggregator's landing page, which displays the syndicated ads. Thus, real-world ad syndication is not transparent to the user. When the user clicks on an ad on the aggregator's page, they are redirected through the syndicating engine to the advertiser landing page, and the syndicating engine charges the advertiser and pays the aggregator. Syndicating engines usually inform the advertiser that the click was on a syndicated ad rather than a search ad, and often give their advertisers a discount (compared to the price charged for clicks on search ads). In addition, the syndicating engine only passes on a portion of this payment to the aggregator, retaining the balance as a syndication fee. Thus, the economics of aggregation are subtly different from the economics of ad arbitrage. These differences are discussed in further detail in the remainder of this section.

2.3.1 Aggregator Price Equilibria:

For purposes of explanation, consider an asymmetric world with two search engines, S and P, where S syndicates its ads, but P does not. This case is modeled because it is an idealization of a real-world search engine, where most aggregators carry ads from an ad syndication program associated with that real-world ad syndication program, but where the search engine itself does not display many ads from aggregators.

For purposes of explanation, a single search query will be considered, and it will be assumed that the market for clicks is highly competitive, so that all advertisers on S have the same bid $B_S$ and therefore pay $B_S$ per click. It is also assumed that all ads on P (including ads from aggregators) will have the same click-through probability if shown in the same position, so that per-click prices are only a function of the bids. The argument carries through when these assumptions are relaxed.

Let $\alpha$ be a discount factor so that the syndicating engine S charges its advertiser $\alpha B_S$ rather than $B_S$ per syndicated click, and let the syndication fee be $\alpha(1-\beta)B_S$ so that an aggregator receives $\alpha\beta B_S$ per syndicated click. The factor $\beta$ is purely under the control of the syndicating engine, S. Finally, let N be the number of ads displayed by each engine.

2.3.2 Ideal Ad Aggregation:

Suppose an "ideal" aggregator is one where a user clicking on the aggregator's ad on P will click on exactly one syndicated ad on the aggregator's page. Of course, this is an idealization, as real users often become distracted or frustrated and leave the aggregator's page before clicking on an ad, or in some cases, the user may click on multiple ads on the aggregator page. However, it is instructive to see that an ideal aggregator could afford to pay up to $\alpha\beta B_S$ per click on P (ignoring overhead costs for hosting and/or maintaining the aggregator's landing page).

The above described idealizations and definitions lead to the following Theorem:

Theorem 1:

The equilibrium price of a click on the $i^{th}$ ad on P is no lower than $\alpha\beta B_S$ as long as i<N, and as long as at least i+1 ideal aggregators exist.

Proof of Theorem 1:

It is assumed that the equilibrium price of a click on the $i^{th}$ slot on P is $B_P<\alpha\beta B_S$ to prove the theorem by contradiction. This means that the $(i+1)^{st}$ bid is $B_P$. Thus, i+1 ideal aggregators could bid amount $B_A$ on P, where $\alpha\beta B_S>B_A>B_P$. Each aggregator would then win a slot and make a profit of at least $(\alpha\beta B_S-B_A)>0$ on each click. The $(i+1)^{st}$ bid is now $B_A>B_P$, so that the price of a click on the $i^{th}$ slot is now $B_A>B_P$. This contradicts the assumption that that the equilibrium price of a click on the $i^{th}$ slot on P is $B_P$.

Thus, when $\alpha=1$ and $\beta=1$, ideal aggregation behaves like arbitrage. The discount rate $\alpha$ and the syndication fee factor $\beta$ both introduce friction, and are analogous to transportation costs in goods arbitrage. In fact, ideal aggregation is entirely equivalent to goods arbitrage in the presence of an asymmetric trade barrier. If both search engines were to syndicate ads, and to allow ads from aggregators, arbitrage in both directions would lead to a Law of One Price.

2.3.3 User Attention and Ad Aggregation:

However, in contrast to the idealized aggregations assumptions described above, aggregation tends to be imperfect in the presence of real-world users. To address this issue, the following discussion considers how the equilibrium price on P is affected when aggregation is imperfect. In particular, the following discussion removes the assumption that a user clicking on an aggregator's ad clicks on exactly one of the syndicated ads displayed by the aggregator. The term "redirection rate" is used to denote the average number of syndicated ads a user clicks on each time he or she arrives at the aggregator page from P. The redirection rate, r, depends on a number of factors, including whether or not the user is attracted to the aggregator page, whether or not they return to P, and whether or not they terminate their search or click on an ad. In short, it depends on what the user chooses to pay attention to.

An aggregator that is more successful at capturing the users' attention will induce users to remain on the aggregator's site (as opposed to returning to the publishing engine) or to keep returning to it, and perhaps to click on more syndicated ads. Such an aggregator can thereby attain a higher redirection rate. This is important because the aggregator earns $\alpha\beta B_S$ per click on a syndicated ad, and therefore earns $r\alpha\beta B_S$ per click on their ad on P. Following the same argument as above, Theorem 2, presented below, is proved:

Theorem 2:

The equilibrium price of a click on the $i^{th}$ ad on P is no lower than $r\alpha\beta B_S$ as long as $i<N$ and at least $i+1$ aggregators with redirect rates of at least r exist.

Thus, in this case, the prices of the slots are differentiated by the aggregators' redirection rates. Assuming their bids exceed the other advertisers' bids (as discussed in further detail below), aggregators can compete and earn profits based on their ability to capture users' attention, which is reflected in their different redirection rates, r. For example, if the top two aggregators have redirection rates $r_1 > r_2$, the top aggregator earns a profit of $(r_1 - r_2)\alpha\beta B_S$. This profit is stable as long as the redirection rates are greater than one and differ from each other. This is in contrast to ideal aggregation and goods arbitrage, where arbitrageurs cause price convergence, which in turn causes the arbitrage opportunity to disappear.

2.4 The Impact of Ad Aggregators:

In general, ad aggregators are believed to have a negative impact on both users and actual merchants. In particular, as noted above ad aggregators often displace the ads of merchants completely, while causing users to be directed to pages full of ads rather than to merchant pages where they can actually purchase a produce that they may be looking to buy. The following paragraphs discuss these concepts in greater detail.

2.4.1 Impact on Merchants:

Online merchants are directly affected by the practice of ad aggregation. In particular, online merchants are advertisers that earn revenue by selling to the consumer, in contrast to ad aggregators that earn revenue through the practice of ad aggregation. Suppose a merchant that advertises on S also desires to advertise on P. Such a merchant would already have some click volume from users of P through aggregators that advertise on P and display the merchant's aggregated ad, although the merchant may not be aware of this. However, the volume of clicks received through aggregators for the merchant's ad is typically lower than the volume that would be received by winning a top slot (i.e., a more desirable slot) for that same ad on P.

If the merchant values a click on P at $\alpha B_S$ (what they are currently paying for this traffic), they are only able to outbid aggregators with $r<1/\beta$. If they are willing to pay up to $B_S$, they are able to outbid aggregators with $r<1/\alpha\beta$. Since the prices of the top slots are set by aggregators with higher redirection rates, the merchant would only be able to win lower slots (i.e., less desirable slots) in the auction, if they are able to win any slots at all. As a result, the merchant would get a lower level of traffic than they would have gotten in the absence of aggregators.

Thus, aggregators have an adverse impact on online merchants, and provide them with a disincentive to advertise on P. It is interesting to note that if all the aggregators were ideal aggregators (i.e., if the situation were analogous to arbitrage), the merchants could compete with the aggregators and the aggregators would have no profit, since the aggregators would have to pay $\alpha B_S$ or $B_S$ respectively per click, and would receive only $\alpha\beta B_S$ per click.

Alternatively, merchants could decide to display syndicated ads themselves, causing their value of a click to increase to at most $(\alpha + r\alpha\beta)B_S$ or $(1 + r\alpha\beta)B_S$ respectively. This is an upper bound because it assumes that syndicated ads have no effect on sales. In reality, merchants would have an incentive to trade off their sales against revenue from aggregation, and move into the spectrum between pure merchant and pure aggregator. The cost to the total user experience (discussed below) is not factored into this trade-off. Thus, there is an incentive for merchants to become aggregators themselves, and thereby compete better. Moreover, merchants will be unable to compete with aggregators under current ad pricing schemes without doing so.

2.4.2 Impact on Users:

Aggregators always have some negative impact on users of the publishing engine (typically a search engine such as Microsoft® Live Search, YAHOO! ® Search, Google™, etc.), since users require at least two clicks rather than one in order to get to a merchant. In the best case, users get access from the publishing engine to merchants that advertise on only the syndicating engine in return for this increased effort. However, the effects described above make the net impact of aggregators on users much worse than in this best case.

First, aggregators with high redirection rates reduce the ability of merchants to win higher slots (i.e., more desirable slots) on the publishing engine directly, or even to advertise on the publishing engine at all. Thus, as fewer and fewer merchants advertise on the publishing engine, or as the existing merchants on the publishing engine win lower and lower slots in the auction, users are forced to go through aggregators more and more often. Thus, the existence of aggregator ads on the publishing engine's auction causes users to have fewer and fewer options for reaching merchant ads other than using an aggregator. This tends to be a rather frustrating experience for users.

Second, as described above, since aggregators' profits depend on their redirection rate, they need to attract and retain users' attention. In particular, if a user reaching an aggregator's site returns to the search results page without clicking on an ad, the aggregator does not recover their payment for the ad click that brought the user to the page. If they only use the aggregator's site to click on a single ad, the aggregator can only benefit from a temporary arbitrage opportunity. Thus, it is in the aggregator's interest to influence the user to not return to the search results page, but rather to return to the aggregator's page and click on other ads. Aggregators typically accomplish this through a variety of methods that further degrade the user's experience. These include:

1. Popups: Clicking on a syndicated ad on the aggregator page causes the corresponding advertiser's landing page to open in a popup window on top of the aggregator page. Closing this window causes the user to see the syndicated ads again, perhaps leading to another click.
2. Redirect Traps: The aggregators landing page silently redirects to another aggregator page, usually via an HTML Meta Refresh tag. The timing of the redirect makes it difficult for the user to use the browser's back button to return to the search results page. In other words, as the user keeps pressing the "back" button on the browser, the silent redirection of the aggregators landing page causes that landing page to keep reloading. Often, users are forced to close the browser and initiate a new browser session, thereby further degrading the user experience.
3. Home Page Traps: Scripts on the aggregator's landing page automatically change the user's home page to a page of the aggregator's choice, without the user's permission. This makes it more likely that the aggregator will get more syndicated clicks from the user at a later session. However, this practice is generally very frustrating for users, thereby further degrading the user experience.
4. Deceptive User Interface: Some ad aggregators design landing pages in an attempt to confuse the user as to what page they are actually on to trick the user into making more revenue earning clicks for the ad aggregator. Again, such practices are generally very frustrating for users, thereby further degrading the user experience. Such deceptive UI's include:
    a. Making the aggregator page look like the results page of a search engine.
    b. Making the aggregator site look like a merchant site.

Thus, while aggregators could theoretically provide users with the service of making syndicated ads available through the publishing engine, the above-described economic incentives cause the aggregators to use techniques that arguably damage the user experience. Note that these incentives are a result of the economic advantage conferred by having a higher redirection rate. Absent this, aggregators would not have an incentive to damage the user experience.

2.4.3 Impact on Syndicating Engine:

Continuing the above-described example, the syndicating engine S receives a profit of $\alpha(1-\beta)B_S$ per syndicated ad click, which means it receives $r\alpha(1-\beta)B_S$ per click on an aggregator's ad on P. Thus, the syndicating engine's profit is increasing in $\alpha$ and decreasing in $\beta$. However, S is constrained in how much it can increase $\alpha$ and decrease $\beta$.

Increasing $\alpha$ reduces the incentive of advertisers to participate in the syndication program. However, this may be alleviated by varying the discount factor $\alpha$ depending on the source of the syndicated traffic, so that $\alpha$ for traffic from a particular aggregator can be discounted depending on its value to the advertisers.

Decreasing $\beta$ is even more constrained. In particular, if the minimum bid necessary to have an ad displayed on P is denoted by $B_P$, then S must ensure that:

$$\beta \geq 1/r\alpha \cdot \underline{B_P}/B_S \qquad \text{Equation (1)}$$

Otherwise, the aggregator will be unable to bid high enough to be displayed, and neither the aggregator nor the syndicating engine will profit.

It is evident that within these limits, the syndicating engine can vary $\alpha$ and $\beta$ for each aggregator and each advertiser to optimize its profits. It is also possible to vary $\alpha$ and $\beta$ competitively, to impact the publishing engine's profits and the incentives of the advertisers to participate in the publishing engine's auction. For example, since the most an aggregator can afford to bid on the publishing engine is $r\alpha\beta B_S$, and since the syndicating engine can set $\beta$ on a per-aggregator basis, the syndicating engine may, for strategic reasons, hold $\beta$ low enough to ensure that $r\alpha\beta B_S$ is lower than $B_S$, thereby delaying or perhaps even preventing price convergence. On the other hand, doing so increases the incentive for merchants to advertise on the publishing engine directly.

2.5 Exemplary User Behavior:

In constructing the pricing rules described in further detail in Section 2.7, a quantitative study of user behavior on search engines and advertiser sites was performed in order to gauge statistical user behaviors. In particular, this study of user behaviors demonstrated that aggregators are able to achieve significant redirection rates, and that they are able to win better ad slots (i.e., more desirable slots) than the very advertisers whose syndicated ads they carry using real world tests of particular query examples.

Figure 2:
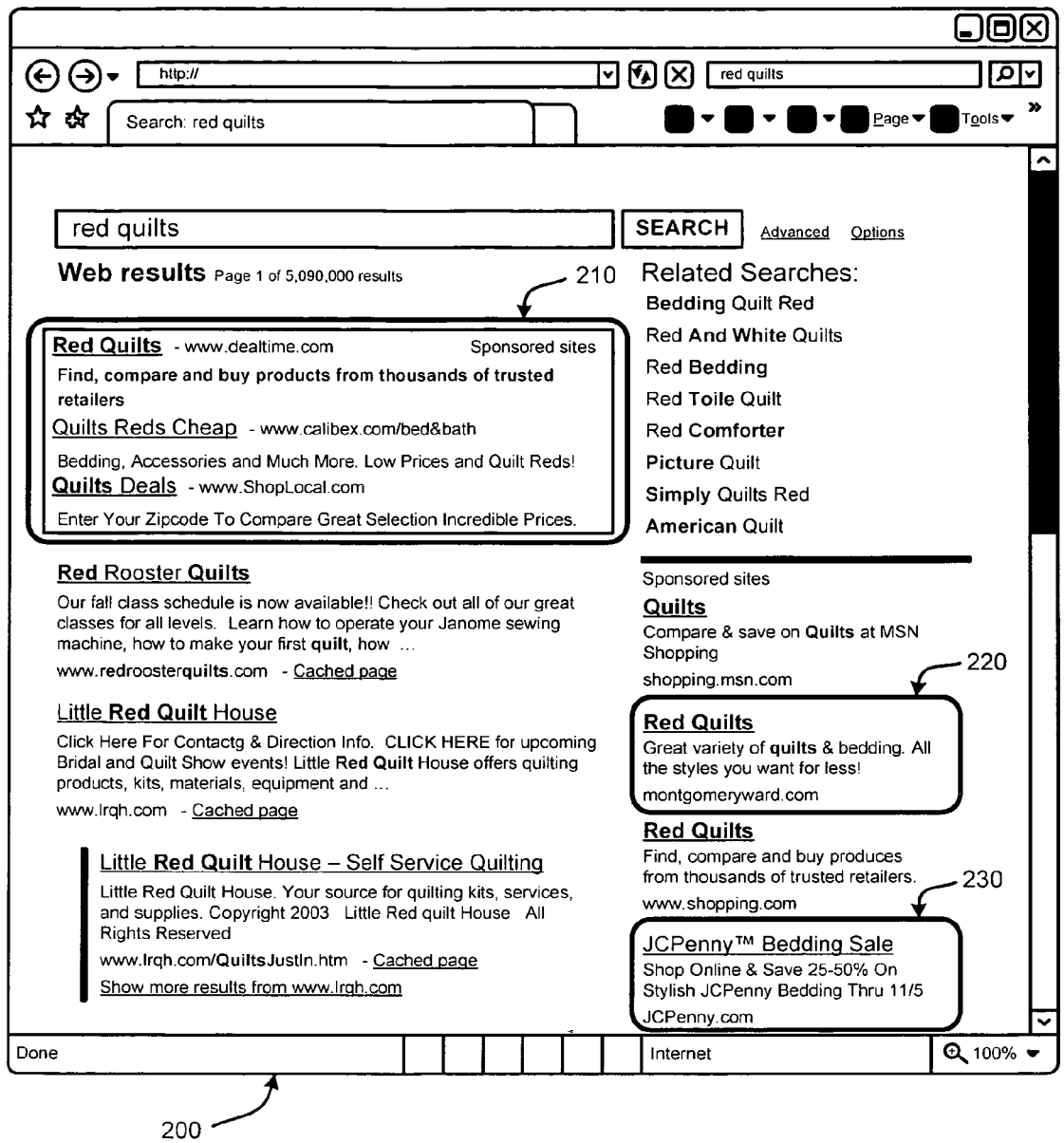
FIG. 2 illustrates a search results page of a first real-world search engine for a query term "red quilts," showing that ads of ad aggregators occupy the top slots (i.e., the most desirable slots) while ads of actual merchants occupy lower slots (i.e., less desirable slots).
Figure 3:
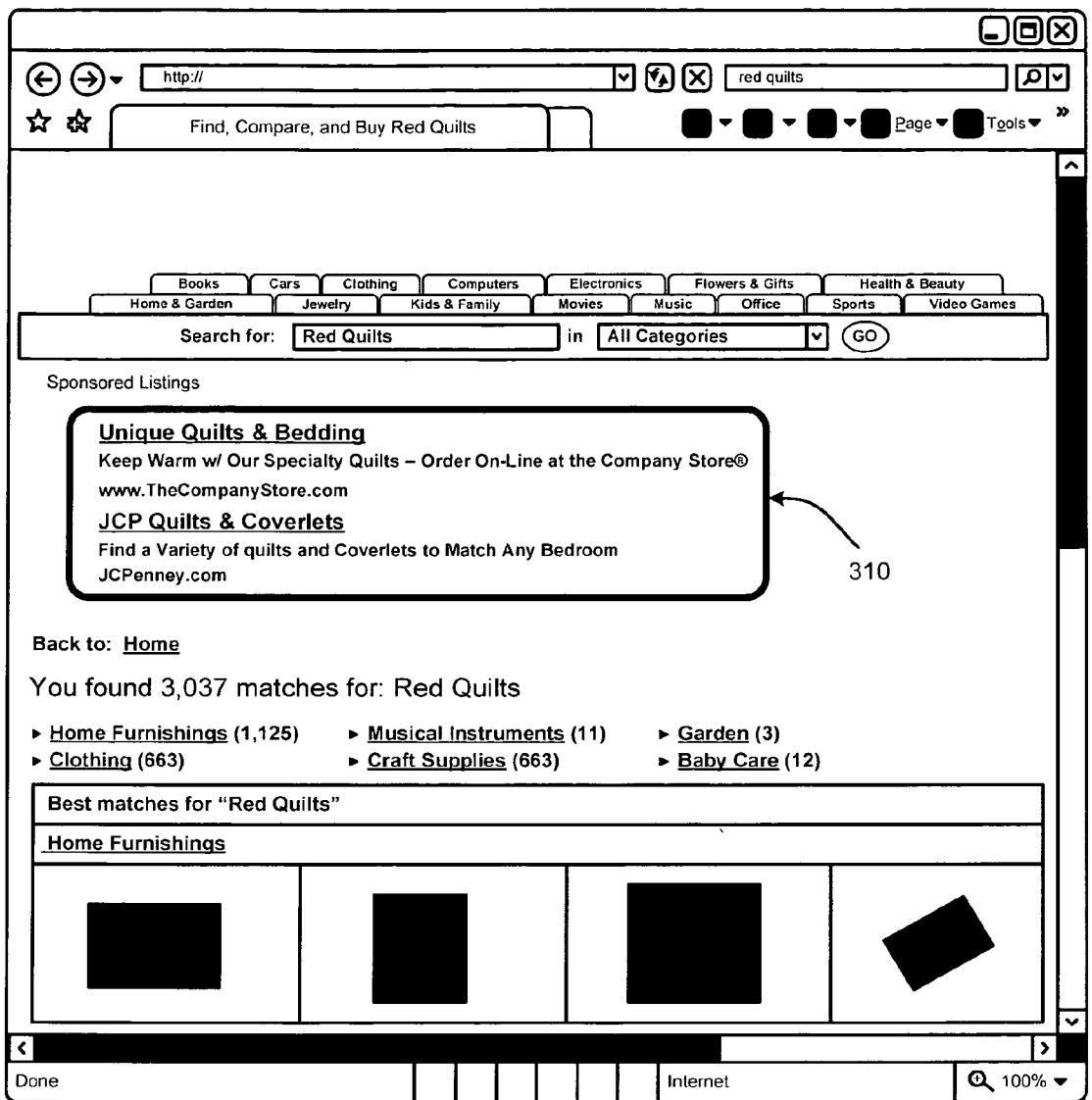
FIG. 3 illustrates a "landing page" reached by clicking one of the aggregator ads shown in FIG. 2.

For example, as illustrated with respect to FIG. 2, using a first real-world search engine, a query term "red quilts" was entered into the search box. The search engine 200 then returned the results of that search, along with search ads based on the keywords "red," "quilt," and perhaps "red quilts." As can be seen, the top three ad slots 210 (i.e., the three most desirable ad slots) shown in the results page of the real-world search engine are occupied by aggregators who defeat ads of the two merchants shown to the right, 220 and 230, respectively. As illustrated by FIG. 3, clicking on one of the aggregator ads 210 leads to a page 300 where syndicated ads from two merchants are prominently displayed 310. Following the URLs of the two syndicated ads 310 on the aggregator landing page 300 reveals that both of these ads have been syndicated by a second real-world search engine. In fact, entering the query "red quilts" on a separate search using the second real-world search engine confirmed that the two merchants shown in the ads 310 were the top advertisers on second real-world search engine for the query "red quilts."

Further examination of the results page 200 of the first real-world search engine illustrated by FIG. 2 reveals that one of the two merchants appears there as well (see element 230), but that numerous aggregators have pushed the merchant to the last slot (i.e., the least desirable ad slot) on the search results page. Thus, while that merchant was able to win a top slot on second real-world search engine (see FIG. 3, element 310), an aggregator was able to outbid the merchant on the first real-world search engine, even though the merchant is one of that aggregator's top two syndicated advertisers for the keywords used. While it is possible that merchants are bidding more on the second real-world search engine than on the publishing engine (i.e., the first real-world search engine), or that the aggregators achieve higher click-through probabilities, this suggests that the aggregator achieves a high enough redirection rate to outbid the merchant.

The user study described below confirmed that this particular aggregator had a redirection rate of 1.1, which is high enough to defeat the merchant even if they bid the same amount on both the first and second real-world search engines, and had as high a click-through probability as the aggregator.

Because the aggregators have displaced the users on the results page of the first real-world search engine, a user who would have reached the merchant in one click in the absence of aggregators now needs two clicks. In fact, clicking on a syndicated ad on the aggregator page shown in FIG. 3 causes the ad landing page to open in a popup browser window, which arguable further damages user utility and increases the probability of further clicks on syndicated ads, as discussed in the previous section.

Note that it could be argued that sites like the aggregator of FIG. 3 provide the user with additional utility from price comparisons. However, data collected from an actual user study involving several thousand participants (see Section 2.5.1) showed that when users enter the aggregator site by clicking ads from a real-world search engine, over 90% of the outgoing clicks were in fact on syndicated ad clicks rather than on price comparisons. In fact, users who enter the aggregator site directly (instead of through an ad on the real-world search engine) and search for "red quilts" are not presented with the prominent syndicated ads. Thus, it would seem that the aggregator responsible for the landing page illustrated by FIG. 3 optimizes the prominence of syndicated ads and price comparisons based on their estimate of the likelihood of a user clicking on a syndicated ad or a price comparison.

2.5.1 Aggregator Impact on User Behavior:

A quantitative user study was performed to determine how often situations such as the one described above occur in practice, and whether aggregators are able to achieve significant redirection rates. This was done by instrumenting participating users' web browsers with their express permission. Search queries were then collected along with the resulting ad clicks and clicks on advertiser sites over a period of a few hours, from a large population of users. These queries and clicks were issued by the participating users in their day-to-day web browsing, rather than explicitly for the purpose of the study. This resulted in most users yielding no data, since most users did not click on any ads during the period of the study, but it ensured that the studied user behavior was as close to natural as possible. However, the study did capture data for user behavior observed in approximately 4,500 search ad clicks, and the resulting aggregated syndicated ad clicks, from about 2,700 users of a specific real-world search engine.

The results of the study showed that the ten advertisers with the highest number of clicks in the study all had redirection rates higher than zero. Further investigation of those advertisers indicated that most of the top ten advertisers were aggregators, and that the majority of the aggregators achieve redirection rates higher than unity (i.e., >1). That is, they will be able to win the ad auction even if price convergence between the real-world search engine and any separate ad syndicating engines takes place. Visiting the ad landing pages shows that these high redirection rates are generally achieved through deceptive UIs, popups, redirection traps, and homepage traps.

It is interesting to note that all three merchants that appeared in the top ten advertisers list displayed syndicated ads from which they earned revenue, in line with the incentives described in the previous section. Such merchants are referred to herein as "aggregating merchants."

An examination of the aggregating merchant web sites shows that they typically aggregate syndicated ads to "back fill" their inventory. In cases where these merchants have inventory that matches the user's query, they tend not to display syndicated ads, or at least make them less prominent. In cases where they do not have inventory that matches the user's query, these merchants aggregate, prominently displaying syndicated ads. In these cases, users clicking on a reputable merchant's ads are presented with syndicated ads rather than items available for purchase from that merchant, arguably violating the users' expectations. Further investigation of this issue revealed that only 12 advertisers (i.e., "pure merchants") in the top 50 advertisers with high click volume refrained from using syndicated ads to enhance revenue.

Thus, the empirical data is consistent with the theoretical results described above. In particular, top advertisers earn revenue from syndicated ads. Having a high enough redirection rate to be able to defeat pure merchants in the auction is not merely a theoretical possibility, as actual testing of a large number of users showed that many aggregators achieve such redirection rates, and are able to win prime positions on the publishing engine's results pages.

2.6 Collection and Evaluation of Statistical Information:

In general, statistics are collected in order to quantify several factors, such as advertisement statistics and user behavioral statistics. For example, advertisement statistics may include information such as how well a particular ad matches a particular query (i.e., "query/ad match scores"), or whether a particular query matches a particular landing page (i.e., "query/landing page match scores"). User behavioral statistics (such as, for example, how a user responds to an ad or a landing page) are used either by themselves, or combined with other advertisement statistics (e.g., query/ad match scores, or query/landing page match scores) to generate quality factors, Q, that are assigned to particular ads or to particular advertisers.

In various embodiments, each of these factors can be used independently, combined in any desired combination, or weighted with or without combining, to reflect a desired importance level. For example, behavioral statistics can be combined with query/ad match quality and/or query/landing page match scores, with different weighting factors being applied to any or all of these three elements. Regardless of how various elements are combined or weighted, as described in Section 2.7, the resulting quality factors, Q, are used in ad pricing to improve user experience and to foster fairness in bidding between ad aggregators, aggregating merchants, and pure merchants.

2.6.1 Behavioral Statistics:

Behavioral statistics relating to particular advertisements can be collected in several ways, such as via instrumentation of a group of clients or users, instrumentation of a server or proxy to collect user search and click data, or through the use of cookies or the like. In various embodiments, this statistical information is collected for each unique advertisement, for each unique advertiser, and/or each unique advertiser domain. Further, the information is preferably collected for as large a group of users as possible in order to ensure the validity of the resulting statistical information. Once collected, in various embodiments, these statistics are aggregated at any or all of the user, geographic region, account, advertiser, campaign, ad group, or keyword level, relative to specific ads. Note that instrumentation of clients, servers, or proxies in order to collect data relating to browser operations is known to those skilled in the art, and will not be described in detail herein.

In various embodiments, some or all of the statistical items described below are combined to provide a "quality factor," Q, that is used to penalize ad aggregators to level the playing field with respect to merchants, as described in further detail in Section 2.7. In particular, the lower the quality factor, the more expensive it is to win a bid for placing a corresponding ad. In particular, at a minimum, the following two elements of statistical information is collected for each unique ad:

1. A number of times the ad landing page is reached through an ad click on the search results page of the search engine (i.e., variable "L" for number of times that the ad landing page is reached by the ad click).
2. A number of times the landing page domain redirected the user off domain (i.e., the end URL domain is different than the landing page domain) in the same session after the ad landing page is reached through an ad click on the search results page (i.e., variable "R" for number of redirections).
   a. In various embodiments, these redirections are also evaluated by collecting statistics regarding the specific destination domains of the redirections, since such redirections may not always be to the same domain.
   b. Note that in various embodiments, redirects to domains that are pre-approved by a business may be excluded from use in computing redirection statistics. For example, "Verizon.com" redirects to "vzw.com." This is a legitimate redirect that should not be counted against the advertiser. In various embodiments, this issue is address by either having a database of the legitimate URLs for each advertiser (populated by the business or advertiser), or simply "forgiving" some number (e.g., on the order of about 5 to 10) of unique URLs an advertiser redirects to.

Then, given the two statistical elements described above, in various embodiments, the redirect rate is computed as $$r = \frac{R}{L},$$

and the quality factor, Q, is simply computed as follows, where $$Q = \frac{1}{1+r} = \frac{L}{R+L}.$$

Clearly, as the number of redirects increases, the quality factor is decreased.

Additional optional statistical information that is collected in various embodiments includes some or all of the following statistical elements:

1. A client time elapsed between reaching the landing page domain and leaving it (i.e., variable $T_{domain}$). Longer user dwell times on the landing page domain are generally assumed to correspond to higher user satisfaction with the content provided on the landing page and the associated domain. However, these dwell times can also result from the aforementioned redirect traps that prevent the user form easily leaving the domain. Thus, assuming that no redirect traps are involved, in one embodiment, the quality factor, Q, is simply computed as Q=. Conversely, if redirect traps are identified on domain of the landing page, then the quality factor, Q, can be computed as $$Q = \frac{L}{(R+L) * T_{domain}}$$

where the time on the domain is a negative since the user was essentially tricked into staying longer.

2. A number of times the user visits a different search engine immediately after visiting the landing page domain (i.e., variable "D" to indicate the number of times that a different search engine is visited). In other words, this statistic captures that number of time that the user leaves the landing page domain by visiting a different search engine from the one that sent the user to that landing page. Basically, this statistic can provide a measure of user dissatisfaction with both the landing page resulting from clicking on a particular ad, and the search engine that sent them there. Thus, in one embodiment, the quality factor, Q, can be computed as Q=L/((R+L)*D).
3. A client time elapsed between reaching the ad landing page and leaving it (i.e., variable $T_{page}$). Longer user dwell times on the landing page are generally assumed to correspond to higher user satisfaction with the content provided on the landing page. However, these dwell times can also result from the aforementioned redirect traps that prevent the user form easily leaving the page. Thus, assuming that no redirect traps are involved, in one embodiment, the quality factor, Q, is simply computed as Q=(L*$T_{page}$)/(R+L). Conversely, if redirect traps are identified on the landing page, then the quality factor, Q, can be computed as Q=L/((R+L)*$T_{page}$) where the time on the page is a negative since the user was essentially tricked into staying longer.
4. A number of times the user goes immediately back to the search results page after the ad landing page is reached through an ad click on the search results page, with no intervening events (i.e., variable I, for immediate return). In this case, it is assumed that the landing page was of little or no interest to the user. Thus, in one embodiment, the quality factor, Q, can be computed as Q=L/(I*(R+L)).
5. A time elapsed between reaching the ad landing page through an ad click on the search results page and returning to the results page.
6. A number of times the user goes back to the search results page after the ad landing page is reached through an ad click on the search results page, with intervening events such as clicking on other links or visiting other pages.

Clearly, the quality factor, Q, can be computed based on a variety of user statistics. Further, as noted above, some or all of the above described statistical information can be combined to compute the quality factor. In related embodiments, statistical information associated with some or all of the above described statistical elements are weighted to reflect their relative importance. For example, when one statistical element is considered to have a higher priority than another statistical element, these elements can be combined by giving more weight to the higher priority item when computing the corresponding quality factor.

The bottom line is that various elements of statistical information are gathered with respect to user responses or behaviors. This statistical information is then used to determine the "quality factor" for scoring the user experience with respect to a particular ad, advertiser, landing page, or domain, with higher quality factors directly corresponding to improved user experiences. In addition, it should be noted that as data is collected over time, the resulting quality factors computed from that statistical data may change. Consequently, the resulting quality factors may be considered as dynamic factors or scores that can change over time.

Further, in order to maintain consistency between quality factors associated with different ads, advertisers, landing pages, or domains, in various embodiments, quality factors are normalized, such as, for example, by ensuring that $Q \leq 1$, with 1 then being the best quality factor achievable. Note that as discussed below, in various embodiments, the quality factor for the ads of "pure merchants" (i.e., no ad aggregation) can be automatically set to a value of $Q=1$. In this case, the bids of any other "aggregating merchant" or ad aggregator is penalized by at least some amount (since in their case, it is likely that $Q<1$) relative to the pure merchant such that the playing field between pure merchants and aggregators is better leveled. At the same time, this concept ensures that user experience improves based on the aforementioned statistical evaluations of user behavior for computing the quality factors.

In addition, as noted above, the above described statistical elements can be aggregated at any or all of the user, geographic region, account, advertiser, campaign, ad group, or keyword level, relative to specific ads. For example, by keeping track of specific users, the quality factors associated with the behavior of individual users can be used to improve the ad experiences of those individual users. Clearly, this concept can be extended to groups of two or more users, or to users from particular geographic regions.

2.7 Aggregator Pricing Rules of the Quality-Based Ad Pricer:

In view of the various types of statistical information discussed in Section 2.6, and the considerations discussed in Sections 2.2 through 2.5, the Quality-Based Ad Pricer provides an aggregator pricing rule that guards against the negative impacts that aggregators can otherwise have, while also improving user experience as a statistical function of user behavior. This pricing rule is a modified GSP auction that incorporates the aforementioned quality factor Q in ranking and pricing. Note that in contrast to conventional "quality scores" or other "quality factors," which are specifically based the click-through probability for a particular ad or advertiser, the quality factor Q provided by the Quality-Based Ad Pricer is a generally a property of the advertiser's site relative to the user statistics described in Section 2.6.

In general, the aggregator pricing rule proceeds in two steps. First, ads are sorted in decreasing order of the product of their quality factor (see discussion regarding collection of statistics for quality factor determination in Section 2.6), click-through probability, and bid. Second, the $i^{th}$ item in the sorted list is assigned a price per click, P, where:

$$P_{(i)} = \frac{Q_{(i+1)} C_{(i+1)}}{Q_{(i)} C_{(i)}} B_{(i+1)} \qquad \text{Equation (2)}$$

where $Q_{(j)}$ denotes the quality factor of the $j^{th}$ item in the sorted list, $C_{(j)}$ denotes the click-through probability of the $j^{th}$ item in the sorted list, and $B_{(j)}$ denotes the bid of the $j^{th}$ item in the sorted list. Further, in various embodiments, the click-through probabilities are adjusted to be position independent, by factorizing and discounting the effect of position.

Note that this pricing mechanism differs from conventional GSP type auctions with respect to the use of the aforementioned quality factor, which can be thought of as an adjustment applied to the click-through probabilities based on user generated statistical information. Therefore, as with conventional GSP-based pricing mechanisms, the price paid per click by an advertiser is upper bounded by their bid, and it is possible for the advertiser to be charged their full bid (i.e., the bound is tight).

It should be clear that that varying the choice of the quality factor, Q, will yield a family of pricing rules that generalize the usual GSP based pricing. Further, the Quality-Based Ad Pricer sets conditions on the quality factor, Q, such that either or both of the following principles are satisfied:

1. The publishing engine should ensure that pure merchants (i.e. advertisers with no revenue from syndicated ads) can compete fairly without being penalized for not aggregating.
2. The pricing rule should allow aggregation to drive price convergence.

Note that in view of the description of the ranking and pricing algorithm above that the quality factors of all advertisers can be scaled by an arbitrary positive constant with no effect on the resulting pricing auction. Thus, if it is assumed that that all advertisers that do not display syndicated ads have the same quality factor, it can be assumed that this factor is unity without any further loss of generality (i.e., that the quality factor for "pure merchants" is given by $Q=1$). For purposes of explanation, this assumption is made for the remainder of the discussion of the Quality-Based Ad Pricer.

Note that in one embodiment, setting $Q=1$ for pure merchants, then penalizing all other advertisers with some value $Q<1$ (based on the factors described in Section 2.6 and Section 2.7), is a simple technique for ensuring that pure merchants are able to more fairly compete for ad slots. However, based on the various factors described in Section 2.6, the quality factor is generally higher for pure merchants than for other advertisers. As such, even without setting $Q=1$ for pure merchants, the pure merchants do have some advantage over other advertisers that provide ads and advertising techniques that are assumed to degrade the user experience.

2.7.1 Ensuring Fair Competition Between Merchants and Aggregators:

To ensure fair competition, the Quality-Based Ad Pricer requires that a merchant that is willing to pay $B_S$ per click (the price on the syndicating engine) should be able to outbid an aggregator on the publishing engine. In other words, aggregators should not compete unfairly with merchant ads.

Recall that, as discussed in Section 2.3 and Section 2.4, the aggregator can afford to pay at most $r \alpha \beta B_S$ per click in order to profit from ad aggregation. Thus, it is assumed that the aggregator bids this true value. Further, as noted above, the Quality-Based Ad Pricer acts to ensure that the merchant can win the ad pricing auction as long as the merchant's click-through probability is at least as good as the aggregator's. This concept is illustrated by Equation (3), where:

$$C_M B_S \geq Q_A C_A r \alpha \beta B_S \qquad \text{Equation (3)}$$

as long as $$C_M \geq C_A \qquad \text{Equation (4)}$$

where the subscript M is used to denote the merchant and the subscript A to denote the aggregator such that $C_M$ is the click through probability of the merchant, $Q_A$ is the quality factor of the aggregator, $C_A$ is the click through probability of the aggregator, and it is assumed that $Q_M=1$, as mentioned above. This implies that the quality factor of the aggregator can be bounded by Equation (5), where:

$$Q_A \leq \frac{1}{r \alpha \beta} \qquad \text{Equation (5)}$$

2.7.2 Ensuring Fair Competition Between Merchants:

While the preceding discussion has considered the case of competition between "pure merchants" and aggregators, this setting is somewhat idealized. In particular, as discussed above, "aggregating merchants" also display syndicated ads in order to generate supplemental revenue. In other words, it is possible to add syndicated ads to a merchant site so that any resulting loss in sales revenue is more than offset by revenue from the syndicated ads displayed. Therefore, in various embodiments, the Quality-Based Ad Pricer ensures that a non-aggregating (pure) merchant who does not show syndicated ads can compete fairly with similar aggregating merchants.

In particular, suppose the non-aggregating merchant has a value per click of $B_S$. The aggregating merchant has a value of at most $B_S$ from sales, and a further value of $r\alpha\beta B_S$ from aggregated syndicated ads. It is assumed that the bound between $B_S$ and $r\alpha\beta B_S$ is tight. In other words, it is assumed that it is possible for a merchant to achieve some positive redirection rate without negatively impacting their own merchandise sales. Such an aggregating merchant can bid an amount of up to $(1+r\alpha\beta)B_S$. Therefore, for the non-aggregating merchant to fairly complete, the bid, $B_S$, of the aggregating merchant is given by Equation (6), where:

$$B_S \geq Q(1+r\alpha\beta)B_S \quad \text{Equation (6)}$$

which requires that the quality factor, Q, is limited by Equation (7), where:

$$Q \leq \frac{1}{1+r\alpha\beta} \quad \text{Equation (7)}$$

Note that ensuring that non-aggregating merchants can compete fairly with aggregating merchants also ensures that they can compete fairly with pure aggregators.

Since $\alpha$ and $\beta$ are both determined by the syndicating engine, and since it is possible for the engine to adjust these factors to manipulate the auction on the publishing engine, a conservative choice is to use the following:

$$Q \leq \frac{1}{1+r} \quad \text{Equation (8)}$$

Further, if a maximum discount factor, $\alpha^*$, that the syndicating engine can use is fixed by the advertisers' value of syndicated clicks to be less than one, this choice can be relaxed to:

$$Q \leq \frac{1}{1+r\alpha^*} \quad \text{Equation (9)}$$

2.7.3 Driving Price Convergence:

Subject to the fair competition constraints above, it is desirable to allow aggregators to drive price convergence, as they would if they were ideal aggregators (arbitrageurs) acting in an ad market with an unmodified pricing rule.

In particular, suppose the highest pure merchant bid $B_P$ on the publishing engine P is less than the price per click $B_S$ on the syndicating engine S. Either the same merchants are bidding $B_P < B_S$ on P while bidding $B_S$ on S, or merchants willing to pay $B_S > B_P$ are not participating in the auction on P. Assuming the value of clicks are the same on both P and S, it is desirable for aggregators to have an incentive to bid $B_P' > B_P$. In particular, such bids will either forces merchants to bid their true value (to avoid being displaced by aggregators bidding $B_P'$), or it provides the users of P and the merchants on S direct access to each other (i.e., one click from the ad to the merchants landing page). In short, it is desirable for aggregators to have the incentive to perform the positive functions of ideal aggregators or arbitrageurs.

Thus, aggregators can profitably drive price convergence as long as their revenue per click $r\alpha\beta B_S$ exceeds their cost per click $$\frac{B_P}{Q},$$

if the aggregator and merchant had the same click-through probability. Thus, aggregators can profitably drive price convergence as long as:

$$Q > \frac{1}{r\alpha\beta}\frac{B_P}{B_S} \quad \text{Equation (10)}$$

Similarly, aggregating merchants can only profitably drive price convergence as long as:

$$Q > \frac{1}{1+r\alpha\beta}\frac{B_P}{B_S} \quad \text{Equation (11)}$$

2.7.4 Tension Between Fair Competition and Price Convergence:

As discussed above with respect to Equation (7), guaranteeing fair competition between merchants with and without aggregation requires $$Q \leq \frac{1}{1+r\alpha\beta}.$$

This means that if fair competition is guaranteed, aggregators can only drive price convergence when:

$$B_P < \frac{r\alpha\beta}{1+r\alpha\beta}B_S \quad \text{Equation (12)}$$

Consequently, once $$B_P = \frac{r\alpha\beta}{1+r\alpha\beta}B_S,$$

aggregators with redirection rate r are no longer profitable. Further, driving $B_P$ all the way to $B_S$ would require a pure aggregator with an infinite redirection rate, even if $\alpha=1$ and $\beta=1$.

However, by analyzing the aggregation opportunities of a merchant that can achieve a small redirection rate by carefully displaying aggregated ads in a manner that has no negative influence on sales, the following Theorem can be proved:

Theorem 3:

Suppose that the publishing engine P uses an advertiser quality factor of $$Q = \frac{1}{1 + r\alpha^*}.$$

Then, assuming that advertisers on S value syndicated clicks at $\alpha B_S$, the following results are held to be true:
1. Fair competition is guaranteed irrespective of the values of $\alpha$ and $\beta$,
2. Suppose that the maximal pure merchant bid on P is $B_P$, that this bid represents a merchant's value per click from sales, and that such a merchant could display syndicated ads to achieve some small redirection rate with no adverse effect on sales. Such an aggregating merchant can defeat a pure merchant in the auction as long as $$\frac{B_P}{B_P} < \frac{\alpha}{\alpha^*}.$$

3. Any other choice of Q that guarantees fair competition irrespective of the values of $\alpha$ and $\beta$ will not allow syndicated ads to be profitable for a larger range of $$\frac{B_P}{B_S}.$$

Proof of Theorem 3:
Result (1) of Theorem 3 flows directly from the bound:

$$Q > \frac{1}{1 + r\alpha\beta} \qquad \text{Equation (13)}$$

for fair competition between merchants with and without aggregation, and the assumptions $\alpha \leq \alpha^*$ (by definition of $\alpha^*$) and $\beta < 1$ (assuming that S demands positive revenue from syndication).

Result (2) of Theorem 3 is also true since an aggregating merchant competing with a maximal pure merchant bid could display syndicated ads, earning $B_P + r\alpha\beta B_S$, and would need to bid $(1 + r\alpha^*)B_P$ to defeat them. This is profitable if $(r\alpha\beta B_S - r\alpha^* B_P) > 0$. The syndicating engine gains revenue of $r\alpha(1-\beta)B_S$ from this traffic at no additional cost if $$1 > \beta > \frac{\alpha^*}{\alpha} \frac{B_P}{B_S}.$$

Since $$\frac{B_P}{B_S} < \frac{\alpha}{\alpha^*},$$

such a value of $\beta$ exists, and the aggregating merchant can safely bid $(1 + r\alpha^*)B_P$ and defeat the pure merchant.

Finally, result (3) of Theorem 3 is also true since an aggregating merchant competing with a pure merchant with maximal bid could earn at most $B_P + r\alpha\beta B_S$ and would need to bid $$\frac{B_P}{Q}$$

to defeat the pure merchant. This is profitable only if $$r\alpha\beta B_S > \left(\frac{1}{Q} - 1\right)B_P.$$

The highest value of $$\frac{B_P}{B_S}$$

for which this can occur is $$r\alpha\beta / \left(\frac{1}{Q} - 1\right).$$

Since $\beta < 1$ by assumption, and $$Q \leq \frac{1}{1 + r\alpha^*}$$

for fairness, displaying syndicated ads is only profitable when $$\frac{B_P}{B_S} < \frac{\alpha}{\alpha^*}$$

if the pricing rule allows fair competition between aggregating and non-aggregating merchants.

Thus, in view of Theorem (3), the aggregator pricing rule is given by Equation (14), where:

$$Q = \frac{1}{1 + r\alpha^*} \qquad \text{Equation (14)}$$

Under the pricing rule of Equation (14), pure aggregators and aggregating merchants will only participate in the auction until the per-click price increased beyond the point of profitability. In particular, pure aggregators would only be profitable until the price reached $$\frac{r\alpha\beta}{1 + r\alpha^*}B_S,$$

while aggregating merchants could only profit from aggregating until the price reached $$\frac{1 + r\alpha\beta}{1 + r\alpha^*}B_S.$$

Therefore, when the price for pure aggregators and aggregating merchants reaches this point, the syndicating engine ceases to earn revenue through the traffic on the publishing engine. Therefore, the syndicating engine has an incentive to increase the value of α to α*, and to increase β to be as close 1 as profitable in order to retain some share of this revenue for as long as possible. Even then, merchants would have no incentive to aggregate after the price reached $B_S$, and at this point, the syndicating engine would lose the associated revenue.

Although the preceding discussion has only described aggregation of pay-per-click ads across search engines, the effects described can arise in more general settings. For example, the same techniques can be used for selecting and pricing contextual ads. Also, similar arguments can be made for pay-per-impression and pay-per-action pricing. In these cases, the click-through probabilities in the descriptions above would be replaced by a payment probability, which is "1" in the case of pay-per-impression pricing, the click-through probability in the case of pay-per-click pricing, and the action or conversion probability in pay-per-action or pay-per-conversion advertising. Note that even the use of pay-per-action pricing does not alleviate the difficulty with ad aggregation, since the syndicating engine may still use a pay-per-click model, so that aggregators are still able to command a higher expected value per impression that any single pure merchant. The concepts described here can also be extended to aggregators who "round-trip," using the same engine as both the syndicating and publishing engines. Finally, the concepts described herein can also be extended to aggregators who engage in "keyword arbitrage."

Figure 4:
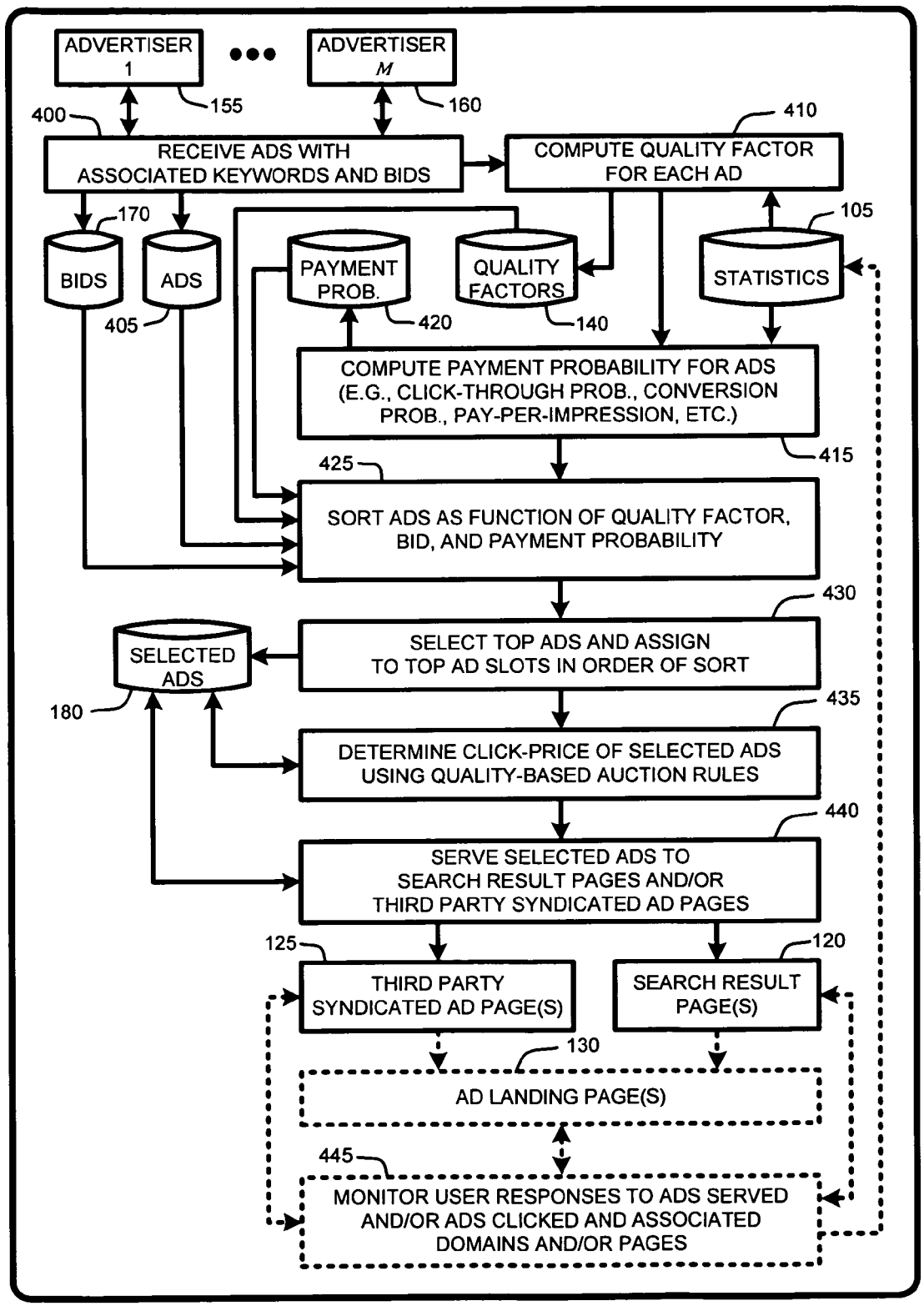
FIG. 4 illustrates a general system flow diagram that illustrates exemplary methods for implementing various embodiments of the Quality-Based Ad Pricer, as described herein.

3.0 Operational Summary of the Quality-Based Ad Pricer:

The processes described above with respect to FIG. 1 through FIG. 3 and in further view of the detailed description provided above in Sections 1 and 2 are illustrated by the general operational flow diagram of FIG. 4. In particular, FIG. 4 provides an exemplary operational flow diagram that illustrates operation of some of the various embodiments of the Quality-Based Ad Pricer described above. Note that FIG. 4 is not intended to be an exhaustive representation of all of the various embodiments of the Quality-Based Ad Pricer described herein, and that the embodiments represented in FIG. 4 are provided only for purposes of explanation.

Further, it should be noted that any boxes and interconnections between boxes that may be represented by broken or dashed lines in FIG. 4 represent optional or alternate embodiments of the Quality-Based Ad Pricer described herein, and that any or all of these optional or alternate embodiments, as described below, may be used in combination with other alternate embodiments that are described throughout this document.

In general, as illustrated by FIG. 4, the Quality-Based Ad Pricer begins operation by receiving 400 ads 405 from one or more advertisers (155 and 160). The Quality-Based Ad Pricer then computes 410 quality factors 140 from behavioral statistics 105 collected through observations of user interaction with the ads and ad landing pages. As discussed above, these quality factors 140 generally provide a measure of user satisfaction with the ads or pages related to those ads.

In addition, the Quality-Based Ad Pricer computes 415 a payment probability 420 for each ad. As noted above, this payment probability 420 varies depending upon the pricing model used. For example, in the case of pay-per click type ad pricing, the payment probability is a click-through probability that represents the probability of a user clicking the ad, and thus the probability that the ad will be paid. In the case of pay-per-impression advertising, ads are paid for whenever they are placed for the user to view. In this case, a probability of "1" can be used in place of the click-through probability since the ad is paid every time it is displayed. With respect to pay-per-action type advertising, "action probabilities" are used instead of click-through probabilities. Clearly, those skilled in the art will appreciate that the Quality-Based Ad Pricer can be used in combination with any desired payment scheme (e.g., pay-per-click, pay-per-impression, pay-per-conversion, pay-per-action, etc.) by simply replacing the click-through-probabilities described herein with the appropriate "payment probability" 420 corresponding to the selected advertising payment scheme.

These quality factors 140 are then used in combination with the payment probability 420 to sort 425 the ads as a function of quality factor, payment probability, and bid 170. For example, in one embodiment, the sorting 425 was performed by using the product of quality factor 140, payment probability 420 and bid 170. Note that any or all of these elements (i.e., quality factor 140, payment probability 420 and bid 170) can also be weighted, if desired, prior to performing the ad sort 425 based on the product of these elements. Given the sorted ads, the highest several ads are selected 430 (depending upon how many ads are to be displayed in available ad slots), the Quality-Based Ad Pricer then determines 435 a click-price for each selected ad 180. For example, in the case of a GSP-type auction and a click-through probability ad pricing model, the click price for each ad is determined 435 as a function of quality factor 140, and click-through probability (i.e., payment probability 420), of each ad and its succeeding ad, and advertiser bid 170 amount corresponding to the succeeding ad. The Quality-Based Ad Pricer then serves 440 the selected ads 180 to search result pages 120 and/or third party syndicated ad pages 120.

Finally, in various embodiments, the Quality-Based Ad Pricer continues to refine the statistics 105 by monitoring 445 user responses to ads that are served to users and/or clicked by users. In particular, as described in Section 2.6, statistics may be gathered for user interaction with ads on the search results pages 120, third party pages 125, and with the landing pages 130 (either merchant pages or ad aggregator pages) that users wind up on after clicking an ad.

Figure 5:
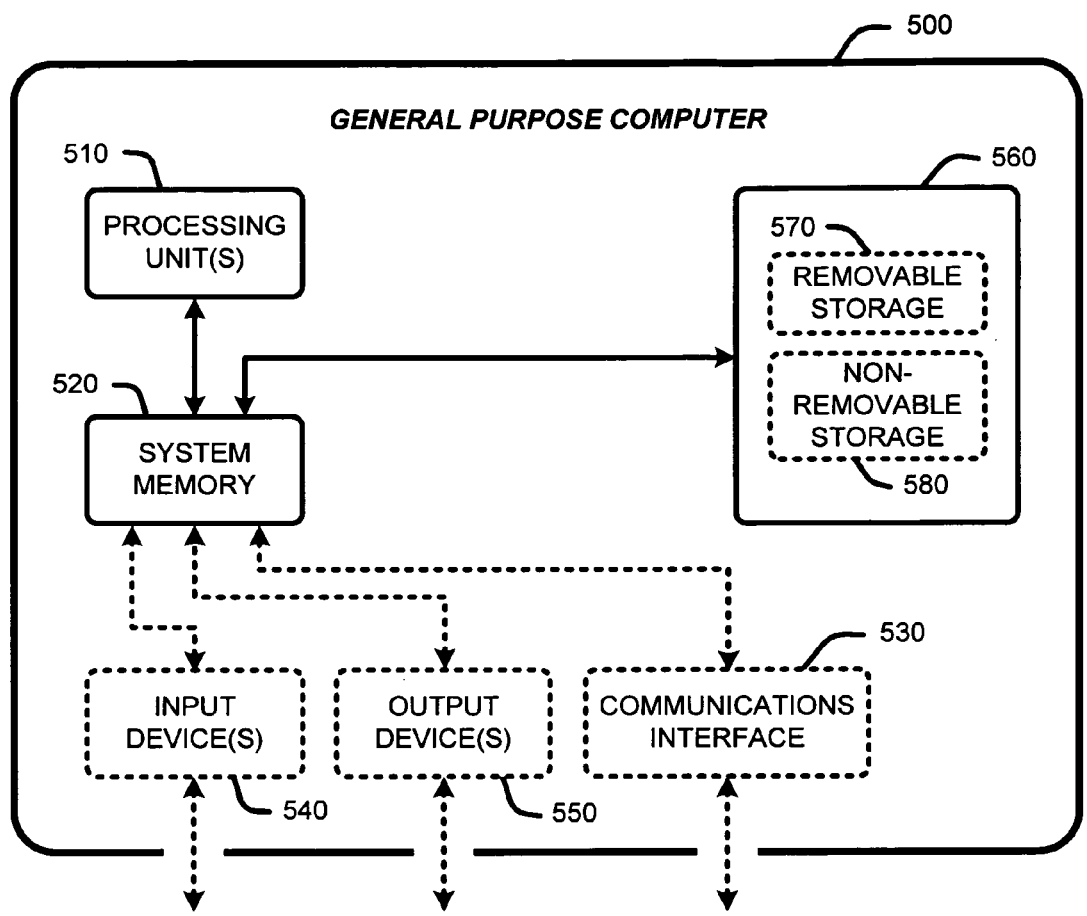
FIG. 5 is a general system diagram depicting a simplified general-purpose computing device having simplified computing and I/O capabilities for use in implementing various embodiments of the Quality-Based Ad Pricer, as described herein.

4.0 Exemplary Operating Environments:

The Quality-Based Ad Pricer is operational within numerous types of general purpose or special purpose computing system environments or configurations. FIG. 5 illustrates a simplified example of a general-purpose computer system on which various embodiments and elements of the Quality-Based Ad Pricer, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device 500. Such computing devices 500 can be typically be found in devices having at least some minimum computational capability, including, but not limited to, personal computers, server computers, hand-held computing devices, laptop or mobile computers, communications devices such as cell phones and PDA's, multi-processor systems, microprocessor-based systems, set top boxes, programmable consumer electronics, network PCs, minicomputers, mainframe computers, audio or video media players, etc.

At a minimum, to allow a computing device 500 to implement the Quality-Based Ad Pricer, the device must have some minimum computational capability along with a network or data connection or other input device for receiving ads to be served, statistical information relating to user responses to those ads, and advertiser bids for those ads. The computing device must also have a network or data connection or other output device for serving quality-ranked and priced ads to search result pages or third party syndicated ad pages, as described herein.

In particular, as illustrated by FIG. 5, the computational capability is generally illustrated by one or more processing unit(s) 510, and may also include one or more GPUs 515. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540. The simplified computing device of FIG. 5 may also include other optional components, such as, for example, one or more conventional computer output devices 550. Finally, the simplified computing device of FIG. 5 may also include storage 560 that is either removable 570 and/or non-removable 580. Note that typical communications interfaces 530, input devices 540, output devices 550, and storage devices 560 for general-purpose computers are well known to those skilled in the art, and will not be described in detail herein.

The foregoing description of the Quality-Based Ad Pricer has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Quality-Based Ad Pricer. It is intended that the scope of the invention be limited not by this detailed description, but rather by the claims appended hereto.

What is claimed is:

1. A method for selecting and determining per-click prices for online advertisements via an automated auction, comprising steps for:
    using a computing device for:
        receiving one or more advertiser bids and one or more corresponding advertisements from each of a plurality of advertisers;
        receiving statistical information characterizing behavior of a plurality of users with respect to each advertisement, wherein the statistical information for each advertisement includes an ad click count that indicates a number of times an ad landing page is reached by clicking the advertisement on a search results page of a search engine, and a redirect count that indicates a number of times a URL redirect is used to change a domain of the ad landing page to a different domain following clicking the advertisement on the search results page of a search engine;
        computing a quality factor for each advertisement as a function of the statistical information by dividing the ad click count by a sum of the redirect count and the ad click count;
        computing a payment probability for each advertisement as a function of the statistical information;
        sorting the advertisements in decreasing order of an effective bid that is a function of the quality factor, the payment probability, and the advertiser bid;
        selecting a number of the top sorted advertisements for display in a corresponding number of available ad slots, wherein the ad slots have a range of most desirable to least desirable, and wherein the selected advertisements are assigned to the ad slots in direct order of sort and desirability, so that the top sorted advertisement is assigned to the most desirable ad slot; and
        computing a price for each selected ad.

2. The method of claim 1 wherein computing the quality factor further includes a function of one or more of:
    ad landing page dwell times following clicking the advertisement on a search results page of a search engine;
    a number of popups observed following clicking the advertisement on the search results page of the search engine; and
    a number of redirects observed following clicking the advertisement on the search results page of the search engine.

3. The method of claim 1 wherein the effective bid is decreased as a direct function of a redirect rate observed for each advertisement, thereby resulting in a lower ranking in the sorting of the advertisements.

4. The method of claim 1 wherein the payment probability is a click-through probability.

5. The method of claim 1 wherein the payment probability is always 1.

6. The method of claim 1 wherein the payment probability is a probability of any user taking an action that triggers a payment from the advertiser.

7. The method of claim 1 wherein computing the price for each advertisement is done according to a generalized second pricing type rule.

8. The method of claim 1 wherein computing the price for each advertisement is done according to a Vickrey-Clarke-Groves type pricing rule.

9. A system for selecting and pricing online advertisements in an automated online auction, comprising:
    a device for receiving a maximum bid price corresponding to one or more specific advertisements from each of a plurality of advertisers;
    a device for receiving statistical information characterizing behavior of one or more users with respect to each unique advertisement;
    a device for computing a quality factor for each advertisement as a function of the statistical information collected for the users by dividing an advertisement click count included in the statistical information by a sum of the advertisement click count and a redirect count included in the statistical information;
    a device for computing a payment probability for each advertisement;
    a device for sorting the advertisements from highest to lowest relative to an effective bid computed for each advertisement as a function of the quality factor of each advertisement, the payment probability of each advertisement, and the maximum bid associated with each advertisement;
    a device for selecting a number of the highest sorted advertisements corresponding to a number of available ad slots; and
    a device for computing a price for each selected advertisement.

10. The system of claim 9 wherein computing the payment probability for each advertisement is a function of a type of ad pricing model used in displaying the advertisements.

11. The system of claim 10 wherein the ad pricing model is selected from a group including a click-through pricing model, a pay-per-impression pricing model, and a pay-per-action pricing model.

12. The system of claim 9 wherein the statistical information for each unique advertisement includes:
the advertisement click count that indicates a number of times an ad landing page is reached by clicking the advertisement on a web page; and
the redirect count that counts a number of times a URL redirect is used to change a domain of the ad landing page to a different domain following clicking the advertisement on the web page.

13. The system of claim 9 wherein the effective bid is decreased as a direct function of a redirect rate observed for each advertisement, thereby resulting in a lower ranking when the sorting of the advertisements.

14. A computer-readable medium having computer executable instructions stored therein for selecting and pricing online advertisements in an automated online advertisement auction relative to one or more keywords, said instructions comprising:
receiving one or more advertisements from each of a plurality of advertisers, each advertisement having one or more corresponding maximum bids;
receiving statistical information characterizing behavior of a plurality of users with respect to the advertisements;
computing a quality factor for each advertisement as a function of the statistical information by dividing an advertisement click count included in the statistical information by a sum of the advertisement click count and a redirect count included in the statistical information;
determining a payment probability for each advertisement as a function of a type of advertisement pricing model being used;
computing an effective bid for each advertisement as a function of the quality factor of each advertisement, the payment probability of each advertisement, and the corresponding maximum bid associated with each advertisement;
ranking the advertisements in an order of highest to lowest effective bid;
determining a number of available ad slots, said ad slots having a ranking of highest to lowest desirability;
selecting a number of highest ranked advertisements corresponding to the number of available ad slots and assigning the selected advertisements to the available ad slots with higher ranked advertisements being assigned in rank order to higher ranked ad slots; and
computing a price for each selected advertisement using pricing rules corresponding to the automated online advertisement auction.

15. The computer-readable medium of claim 14 wherein the statistical information for each advertisement includes:
the advertisement click count that indicates a number of times an ad landing page is reached by clicking the advertisement on a web page; and
the redirect count that counts a number of times a URL redirect is used to change a domain of the ad landing page to a different domain following clicking the advertisement on the web page.

16. The computer-readable medium of claim 14 type of advertisement pricing models are selected from a list including:
a click-through pricing model;
a pay-per-impression pricing model; and
a pay-per-action pricing model.

17. The computer-readable medium of claim 4 wherein a type of the automated online advertisement auction is selected from a list including:
a generalized second price (GSP) type auction; and
a Vickrey-type auction.

* * * * *